(12) United States Patent
Chao

(10) Patent No.: US 7,460,180 B2
(45) Date of Patent: Dec. 2, 2008

(54) METHOD FOR FALSE COLOR SUPPRESSION

(75) Inventor: Po-Wei Chao, Taipei Hsien (TW)

(73) Assignee: Realtek Semiconductor Corp., HsinChu (TW)

( * ) Notice: Subject to any disclaimer, the term of this patent is extended or adjusted under 35 U.S.C. 154(b) by 688 days.

(21) Appl. No.: 11/161,959

(22) Filed: Aug. 24, 2005

(65) Prior Publication Data

US 2006/0007354 A1 Jan. 12, 2006

Related U.S. Application Data

(63) Continuation-in-part of application No. 10/710,340, filed on Jul. 2, 2004, now Pat. No. 7,271,850, and a continuation-in-part of application No. 11/161,727, filed on Aug. 15, 2005, and a continuation-in-part of application No. 10/710,072, filed on Jun. 16, 2004, now Pat. No. 7,280,159.

(30) Foreign Application Priority Data

Aug. 16, 2004 (TW) ............... 93124576 A
Aug. 26, 2004 (TW) ............... 93125509 A

(51) Int. Cl.
*H04N 5/21* (2006.01)
*H04N 11/20* (2006.01)
*H04N 9/78* (2006.01)

(52) U.S. Cl. .............. 348/624; 348/450; 348/666; 348/607

(58) Field of Classification Search .............. 348/607, 348/609, 666, 621, 624, 702, 448, 452, 450; 382/167, 275; 345/611
See application file for complete search history.

(56) References Cited

U.S. PATENT DOCUMENTS

| 4,530,004 A | 7/1985 | Achiha et al. |
| 4,670,773 A | 6/1987 | Silverberg |
| 4,706,112 A | 11/1987 | Faroudja et al. |
| 4,723,157 A | 2/1988 | Wendland et al. |
| 4,731,660 A | 3/1988 | Faroudja et al. |
| 4,831,463 A | 5/1989 | Faroudja |
| 4,837,611 A | 6/1989 | Faroudja |
| 4,893,176 A | 1/1990 | Faroudja |
| 4,916,526 A | 4/1990 | Faroudja et al. |
| 4,918,515 A | 4/1990 | Faroudja |
| 4,943,849 A | 7/1990 | Faroudja et al. |
| 4,967,271 A | 10/1990 | Campbell et al. |
| 4,982,280 A | 1/1991 | Lyon et al. |
| 4,984,068 A | 1/1991 | Sugiyama et al. |
| 5,012,329 A | 4/1991 | Lang et al. |
| 5,019,895 A | 5/1991 | Yamamoto et al. |
| 5,023,713 A | 6/1991 | Nishigori |
| 5,027,194 A | 6/1991 | Scheffler |

(Continued)

*Primary Examiner*—Victor R Kostak
(74) *Attorney, Agent, or Firm*—Winston Hsu

(57) ABSTRACT

A false-color suppression method corrects a pixel value of a pixel in a target location of a target frame while de-interlacing video data. The video data includes consecutive first, second and third fields, and the target frame corresponds to the third field. The method records an interpolation type of a first pixel with respect to the target location of a previous frame corresponding to the second field, and corrects the pixel value of the pixel in the target location of the target frame using a pixel value of a reference pixel if the interpolation type of the first pixel is an inter-field interpolation.

20 Claims, 2 Drawing Sheets

U.S. PATENT DOCUMENTS

| | | |
|---|---|---|
| 5,051,826 A | 9/1991 | Ishii |
| 5,055,920 A | 10/1991 | Illetschko et al. |
| 5,063,438 A | 11/1991 | Faroudja |
| 5,146,318 A | 9/1992 | Ishizuki et al. |
| 5,249,037 A | 9/1993 | Sugiyama et al. |
| 5,305,095 A | 4/1994 | Song |
| 5,305,120 A | 4/1994 | Faroudja |
| 5,428,398 A | 6/1995 | Faroudja |
| 5,448,305 A | 9/1995 | Hagino |
| 5,457,501 A | 10/1995 | Hong |
| 5,475,438 A | 12/1995 | Bretl |
| 5,483,294 A | 1/1996 | Kays |
| 5,502,509 A | 3/1996 | Kurashita et al. |
| 5,689,301 A | 11/1997 | Christopher |
| 6,034,733 A * | 3/2000 | Balram et al. ............ 348/448 |
| 6,052,312 A * | 4/2000 | Ishii .................. 365/189.04 |
| 6,108,041 A | 8/2000 | Faroudja |
| 6,133,957 A | 10/2000 | Campbell |
| 6,317,165 B1 * | 11/2001 | Balram et al. ............ 348/699 |
| 6,580,463 B2 | 6/2003 | Swartz |
| 6,891,571 B2 | 5/2005 | Shin |
| 6,956,620 B2 | 10/2005 | Na |
| 6,987,884 B2 | 1/2006 | Kondo et al. |
| 6,995,804 B2 | 2/2006 | Kwon et al. |
| 7,061,548 B2 | 6/2006 | Piepers |
| 7,084,923 B2 * | 8/2006 | Brown Elliott et al. ...... 348/441 |
| 7,098,957 B2 | 8/2006 | Kim et al. |
| 7,271,850 B2 * | 9/2007 | Chao ..................... 348/609 |
| 7,280,159 B2 * | 10/2007 | Chao ..................... 348/609 |
| 2003/0112369 A1 | 6/2003 | Yoo |
| 2004/0017507 A1 * | 1/2004 | Clayton ................ 348/407.1 |
| 2004/0114048 A1 | 6/2004 | Jung |
| 2005/0018086 A1 | 1/2005 | Lee |
| 2005/0134745 A1 | 6/2005 | Bacche et al. |
| 2005/0168650 A1 | 8/2005 | Walls et al. |
| 2005/0270415 A1 | 12/2005 | Jiang |
| 2006/0187344 A1 * | 8/2006 | Corral Soto .............. 348/452 |
| 2006/0203125 A1 * | 9/2006 | Sayre .................... 348/459 |
| 2006/0228022 A1 * | 10/2006 | Chao ..................... 382/167 |

* cited by examiner

METHOD FOR FALSE COLOR SUPPRESSION

CROSS REFERENCE TO RELATED APPLICATIONS

This is a continuation-in-part of U.S. patent application Ser. No. 10/710,072, filed Jun. 16, 2004, entitled "Method and Apparatus for Cross Color and/or Cross Luminance Suppression", U.S. patent application Ser. No. 10/710,340, filed Jul. 2, 2004, entitled "Method and Apparatus for Cross Color/Cross Luminance Suppression", and U.S. patent application Ser. No. 11/161,727, filed Aug. 15, 2005, entitled "De-interlacing Method", which are incorporated in their entirety herein by reference.

BACKGROUND OF THE INVENTION

1. Field of the Invention

The present invention relates to video processing, and more particularly, to false-color suppression.

2. Description of the Prior Art

Conventional television signals (including NTSC format TV signals and PAL format TV signals) are composed of luminance signals and chrominance signals. Generally, the luminance signals and chrominance signals are superimposed on the same carrier within the television signals. When a television receives the television signals, it needs to separate the luminance signals and the chrominance signals so as to display images on the screen.

If the luminance signals and chrominance signals are not completely separated, the problems of cross-color or cross-luminance can arise (collectively, false color effect). As a result, some image defects such as false color artifacts may be present on the screen.

Conventional false-color suppression operations need to perform video detections to determine if the image is still (or stationary) so as to decide the most suitable false-color suppression operation. However, the conventional art not only needs a considerable computational requirement but also needs additional memory space to store video data required for the video detections.

SUMMARY OF THE INVENTION

It is therefore an objective of the invention to provide a method of false-color suppression with reduced computational requirement as well as memory space.

According to a preferred embodiment of the present invention, a false-color suppression method is disclosed. The method is used for correcting a pixel value of a pixel in a target location of a target frame while de-interlacing video data including consecutive first, second and third fields, wherein the target frame corresponds to the third field. The method comprises: recording an interpolation type of a first pixel with respect to the target location of a previous frame corresponding to the second field; and correcting the pixel value of the pixel in the target location of the target frame using a pixel value of a reference pixel if the interpolation type of the first pixel is an inter-field interpolation.

According to an embodiment of the present invention, another false-color suppression method for correcting a pixel value of a pixel in a target location of a target frame generated from video data is disclosed. The video data includes consecutive first, second and third fields, and the target frame corresponds to the third field. The method comprises: generating a first pixel value for the target location of an output frame corresponding to the second field; and correcting the pixel value of the pixel in the target location of the target frame using a pixel value of a reference pixel if the first pixel is generated through an inter-field interpolation.

According to an embodiment of the present invention, a video processing method is disclosed comprising: when de-interlacing video data, selecting one of a plurality of interpolation types for each pixel location to be processed so as to calculate a corresponding pixel value for each pixel location; recording the selected interpolation type of each pixel location to be processed; and determining whether to perform a false-color suppression operation for a calculated pixel value according to the corresponding recorded interpolation type.

According to an embodiment of the present invention, a video processing method for processing video data having a plurality of input image fields to generate a plurality of output image frames is disclosed comprising: for each pixel location of at least a portion of a frame among the output image frames, determining a type of interpolation operation; for each said pixel location, performing a de-interlacing operation by performing interpolation on a plurality of pixel values of the input image fields according to the determined type of interpolation operation, to generate a pixel value of each said pixel location; and for a first pixel location of said portion, determining whether to perform a false-color suppression operation according to the determined types of interpolation operation of a plurality of pixel locations of said portion, to correct the pixel value of said pixel location.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
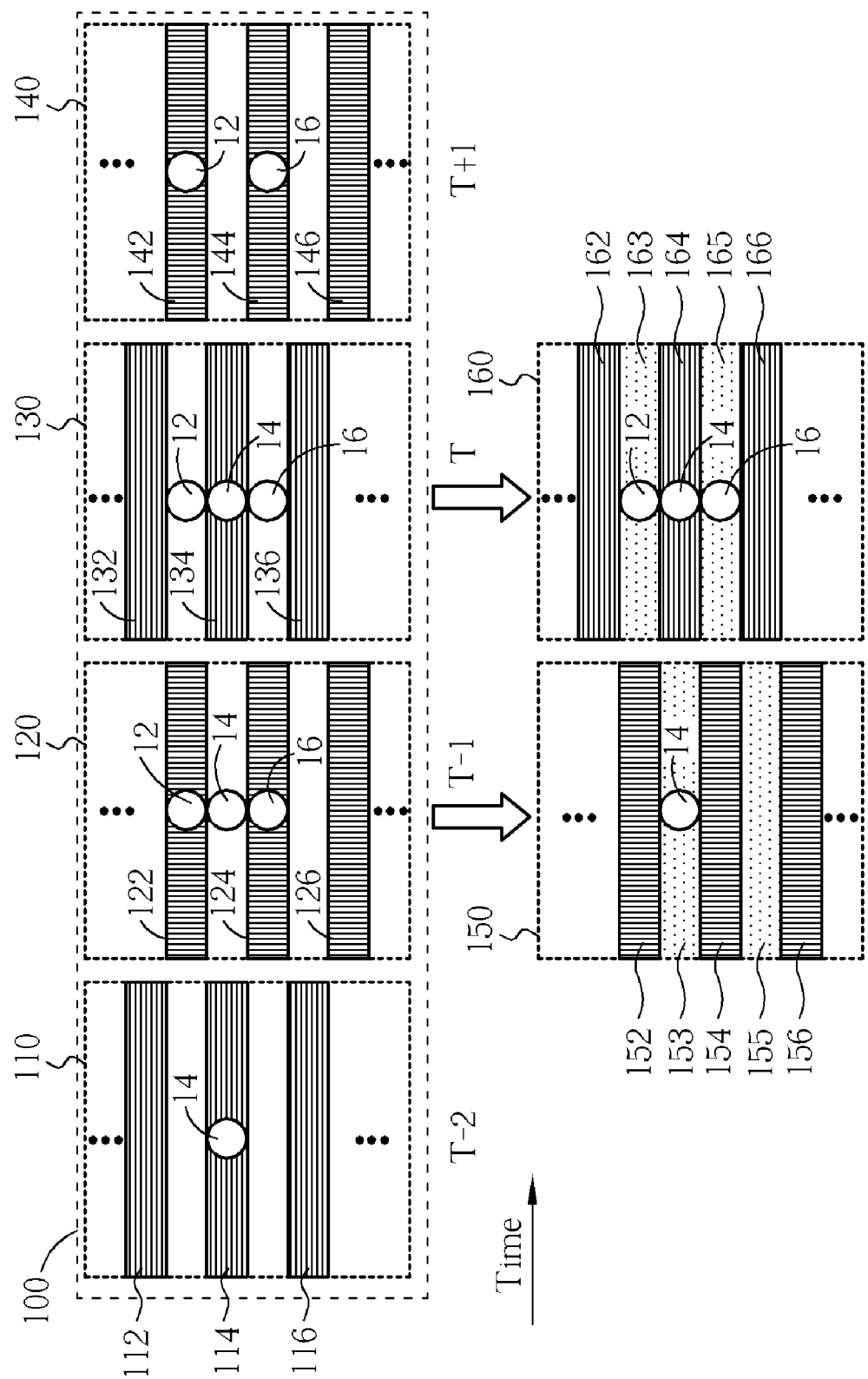
FIG. 1 is a diagram showing video data including four consecutive fields and two corresponding output frames according to an embodiment of the present invention.

Please refer to FIG. 1, which depicts a diagram showing four consecutive fields of a video data 100 and two corresponding de-interlaced output frames 150 and 160 according to an embodiment of the present invention. The output frames 150 and 160 correspond to times T−1 and T, respectively. The four consecutive fields 110, 120, 130, and 140 correspond to times T−2, T−1, T, and T+1, respectively. In FIG. 1, scan lines 112, 122, 132, and 142 are respectively the (N−1)th scan lines of fields 110, 120, 130, and 140; scan lines 114, 124, 134, and 144 are respectively the Nth scan lines of fields 110, 120, 130, and 140; and scan lines 116, 126, 136, and 146 are respectively the (N+1)th scan lines of fields 110, 120, 130, and 140.

Note that the term "pixel value" mentioned hereinafter indicates the luminance or chrominance of a pixel.

The output frames 150 and 160 are de-interlaced from the video data 100 on a pixel-by-pixel basis. When de-interlacing the video data 100, the pixel values of the scan lines 153 and 155 of the output frame 150 can be generated by interpolation using pixel values of fields 110 and 130, which are the preceding field and succeeding field of the field 120 corresponding to time T−1. The pixel values of the scan lines 152, 154, and 156 of the output frame 150 are typically generated by adopting pixel values of the scan lines 122, 124 and, 126 of the field 120. Similarly, the scan lines 162, 164, and 166 of the output frame 160 are typically generated by adopting the scan lines 132, 134, and 136 of the field 130 corresponding to time T. The de-interlacing process is well known in the art and the details are thus omitted herein.

However, pixels of the scan lines in the fields 120 and 130 may present false color as mentioned earlier. In order to reduce the defect caused by pixels with false color, a false-color suppression method correcting pixel values of the scan lines of the output frame according to the detection results obtained in a motion adaptive de-interlacing process of the video data 100 is hereinafter introduced. One of ordinary skill in the art will understand that the false-color suppression method to be detailed can be implemented along with various known or new motion adaptive de-interlacing or motion compensation de-interlacing processes.

For example, when de-interlacing the video data 100 to generate a pixel value for a location 16 of the output frame 160, the de-interlacing operation detects if the image surrounding the location 16 is still, or stationary. If the surrounding image of the location 16 is deemed still, the de-interlacing operation performs an inter-field interpolation to generate the pixel value of the location 16 of the output frame 160 based on pixel values of pixels of the fields 120 and 140 corresponding to the location 16. On the contrary, if the neighboring image of the location 16 is deemed not still, the de-interlacing operation performs an intra-field interpolation to generate the pixel value of the location 16 of the output frame 160 based on pixel values of pixels of the field 130. In other words, the de-interlacing operation performs either the inter-field interpolation or the intra-field interpolation to generate the pixel value of the location 16 of the output frame 160 according to a detecting result of a stillness or stationary detection of the image surrounding or in the vicinity of the target location 16.

If the de-interlacing operation decides to perform the inter-field interpolation to generate the pixel value of the location 16 of the output frame 160, this means that the pixel value of the location 16 of the field 120 is to certain degree similar to the pixel value of the location 16 of the field 140. Based on this characteristic, the detection result of the de-interlacing operation (i.e., whether to use inter-field interpolation or intra-field interpolation) can alone determine whether or not the image of a specific location is still in a false-color suppression context, without adopting other pixel detections. The correction of a pixel value of a target location 14 of the output frame 160 based on the detection results obtained in the de-interlacing operation is described with a flowchart as an embodiment of the present invention.

Figure 2:
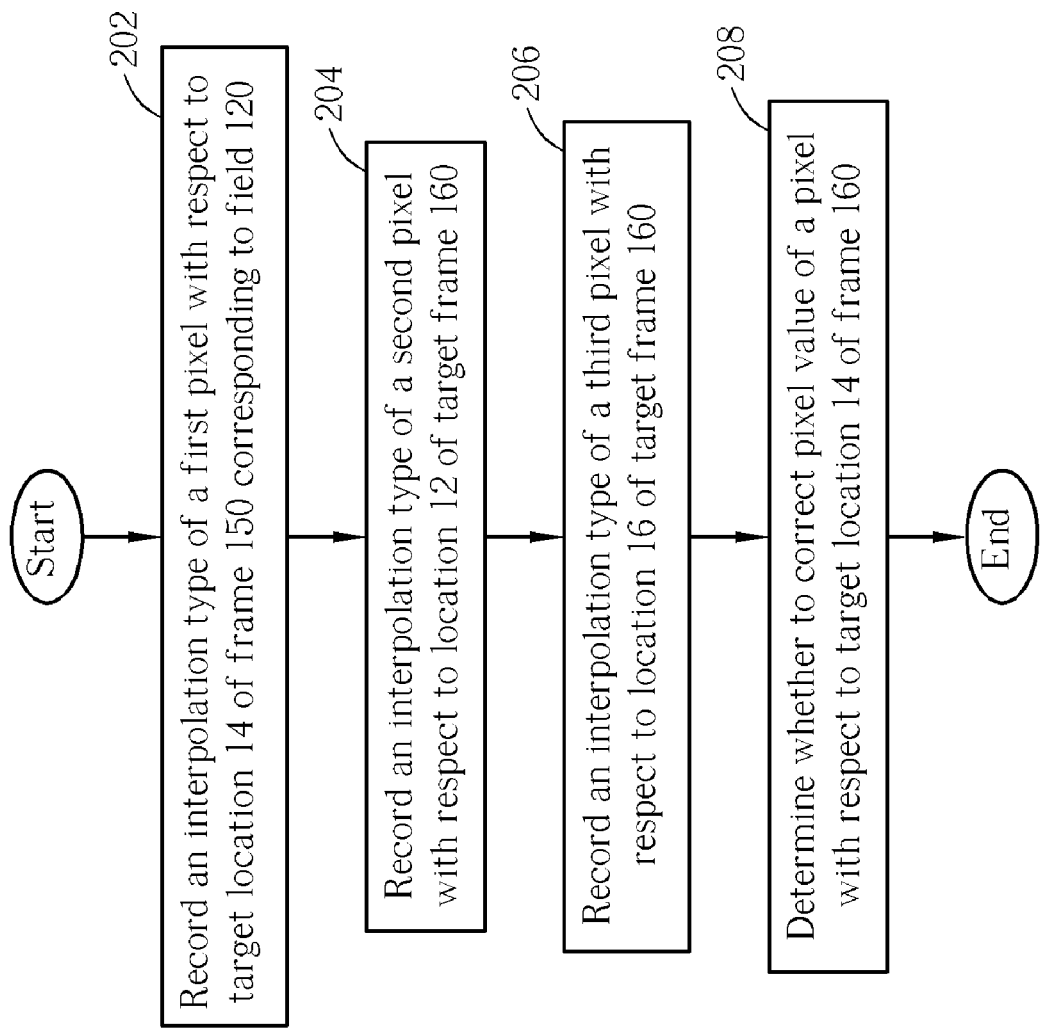
FIG. 2 is a flowchart illustrating an operation of correcting a pixel value of a target location of a frame according to an embodiment of the present invention.

FIG. 2 shows a flowchart 200 illustrating an operation of correcting a pixel value of the target location 14 of the output frame 160 according to an embodiment of the present invention. The steps of the flowchart 200 are described as follows:

In step 202, the false-color suppression method of this embodiment records the interpolation type of a first pixel value of the target location 14 of the output frame 150 while de-interlacing the video data 100 to generate the output frame 160. For example, if the first pixel value of the target location 14 of the output frame 150 is generated through the inter-field interpolation, a bit "1" is accordingly recorded in step 202 as a mark. On the other hand, if the first pixel value is not generated through the inter-field interpolation, a bit "0" is accordingly recorded in step 202 as a mark. In practical implementations, the above marks can be recorded in a buffer.

The de-interlacing process mentioned above that determines the interpolation type, for example, in this embodiment, either inter-field interpolation or intra-field interpolation, can be implemented by performing a motion adaptive de-interlacing process or a motion compensation de-interlacing process, such as that being described in U.S. patent application Ser. No. 11/161,727, filed Aug. 15, 2005, entitled "De-interlacing method", which shares the same inventor as the present invention and is incorporated in its entirety herein by reference, or other known or new de-interlacing processes.

Similarly, while generating the output frame 160, the false-color suppression method of this embodiment performs step 204 to record the interpolation type of a second pixel value of a location 12 of the output frame 160 into the buffer. In this embodiment, if the second pixel value is generated through the inter-field interpolation, step 204 also records a bit "1" as a mark; otherwise, it records a bit "0".

In step 206, the false-color suppression method of this embodiment records the interpolation type of a third pixel value of the location 16 of the output frame 160 into the buffer in the same way.

In step 208, the false-color suppression method of this embodiment can determine whether to perform a false-color correction on the pixel value of the target location 14 of the output frame 160 according to the bits recorded in the above steps. For example, if the first pixel value of the target location 14 of the output frame 160, the second pixel value of the location 12 of the output frame, and the third pixel value of the location 16 of the output frame 160 are all generated through the inter-field interpolation, the surrounding image of the target location 14 can be reasonably determined as still. In this situation, if the video data 100 is in NTSC format, the false-color suppression method of this embodiment performs a false-color correction on the pixel value of the target location 14 of the output frame 160 with a pixel value of the field 110 corresponding to the target location 14. The false-color correction comprises a cross-color suppression operation and a cross-luminance suppression operation. Both the cross-color suppression and cross-luminance suppression operations are well known in the art, such as those being described in U.S. patent application Ser. No. 10/710,072, filed Jun. 16, 2004, entitled "Method and Apparatus for Cross Color and/or Cross Luminance Suppression", or in U.S. patent application Ser. No. 10/710,340, filed Jul. 2, 2004, entitled "Method and Apparatus for Cross Color/Cross Luminance Suppression", both of which share the same inventor as the present invention, and are incorporated in their entirety herein by reference, and further details are thus omitted for brevity.

Note that the locations 12 and 16 are not limited to be in the vertical direction of the target location 14. In addition, the location 12 is not limited to be in the previous scan line of the target location 14. Similarly, the location 16 is not limited to be in the following scan line of the target location 14. Moreover, step 208 can be performed based the interpolation types of more pixel locations.

As mentioned above, if the first pixel value of the target location 14 of the output frame 150 is generated through the inter-interpolation, this means that the pixel value of the field 110 and the pixel value of the field 130 with respect to the target location 14 are similar. Therefore, the interpolation type of the first pixel value of the target location 14 of the output frame can be employed to determine whether to correct the pixel value of the target location 14 of the output frame 160.

Additionally, although the above embodiment is described in an NTSC application, a person skilled in the art should realize that the false-color suppression method of the present invention can also be applied in other TV systems, such as the PAL system. For example, if the video data 100 is in the PAL format and the false-color suppression method mentioned above determines that the pixel value of the target location 14 of the output frame 160 needs to be corrected, a pixel value of the target location 14 of a field corresponding to time T−4 can be used to correct the pixel value of the target location 14 of the output frame 160.

As mentioned, the false-color suppression method of the above embodiment only requires the detection results obtained in the de-interlacing operation to determine if the surrounding image of the target location 14 is still. The method does not require other detections. The computational requirement is thereby significantly reduced. In addition, the method only temporarily stores the interpolation type of a pixel, so that only a small memory space (or buffer space) is required, and the hardware complexity and cost is thereby reduced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A false-color suppression method for correcting a pixel value of a pixel in a target location of a target frame while de-interlacing video data including consecutive first, second, and third fields, wherein the target frame corresponds to the third field, the method comprising:
    (a) recording an interpolation type of a first pixel with respect to the target location of a previous frame corresponding to the second field; and
    (b) correcting the pixel value of the pixel in the target location of the target frame using a pixel value of a reference pixel if the interpolation type of the first pixel is an inter-field interpolation.

2. The method of claim 1, wherein the reference pixel is located in the target location within the first field.

3. The method of claim 1, wherein the third field corresponds to time T while the first field corresponds to time T−2, and the reference pixel is located in the target location within a field corresponding to time T−4.

4. The method of claim 1, further comprising:
    recording an interpolation type of a second pixel with respect to a second location of the target frame;
    wherein a scan line to which the second location belongs is prior to a scan line to which the target location belongs, and step (b) corrects the pixel value of the pixel in the target location of the target frame using the pixel value of the reference pixel only if the interpolation type of the second pixel is an inter-field interpolation.

5. The method of claim 4, further comprising:
    recording an interpolation type of a third pixel with respect to a third location of the target frame;
    wherein a scan line to which the third location belongs is subsequent to a scan line to which the target location belongs, and step (b) corrects the pixel value of the pixel in the target location of the target frame using the pixel value of the reference pixel only if the interpolation type of the third pixel is an inter-field interpolation.

6. A false-color suppression method for correcting a pixel value of a pixel in a target location of a target frame generated from video data, the video data including consecutive first, second and third fields, wherein the target frame corresponds to the third field, the method comprising:
    (a) generating a first pixel value for the target location of an output frame corresponding to the second field; and
    (b) correcting the pixel value of the pixel in the target location of the target frame using a pixel value of a reference pixel if the first pixel is generated through an inter-field interpolation.

7. The method of claim 6, wherein the reference pixel is located in the target location within the first field.

8. The method of claim 6, wherein the third field corresponds to time T while the first field corresponds to time T−2, and the reference pixel is located in the target location within a field corresponding to time T−4.

9. The method of claim 6, further comprising:
    generating a second pixel value for a second location of the target frame;
    wherein a scan line to which the second location belongs is prior to a scan line to which the target location belongs, and step (b) corrects the pixel value of the pixel in the target location of the target frame using the pixel value of the reference pixel only if the second pixel is generated through an inter-field interpolation.

10. The method of claim 9, further comprising:
    generating a third pixel value for a third location of the target frame;
    wherein a scan line to which the third location belongs is subsequent to a scan line to which the target location belongs, and step (b) corrects the pixel value of the pixel in the target location of the target frame using the pixel value of the reference pixel only if the third pixel is generated through an inter-field interpolation.

11. The method of claim 6, wherein the target frame is generated through a motion adaptive de-interlacing operation.

12. A video processing method comprising:
    when de-interlacing video data, selecting one of a plurality of interpolation types for each pixel location to be processed so as to calculate a corresponding pixel value for each pixel location;
    recording the selected interpolation type of each pixel location to be processed; and
    determining whether to perform a false-color suppression operation for a calculated pixel value according to the corresponding recorded interpolation type.

13. The method of claim 12, wherein the plurality of interpolation types comprises an inter-filed interpolation and an intra-field interpolation.

14. The method of claim 12, wherein the false-color suppression operation comprises a cross-color suppression operation.

15. The method of claim 12, wherein the false-color suppression operation comprises a cross-luminance suppression operation.

16. A video processing method for processing video data having a plurality of input image fields to generate a plurality of output image frames, the method comprising:
    for each pixel location of at least a portion of a frame among the output image frames, determining a type of interpolation operation;
    for each said pixel location, performing a de-interlacing operation by performing interpolation on a plurality of pixel values of the input image fields according to the determined type of interpolation operation, to generate a pixel value of each said pixel location; and
    for a first pixel location of said portion, determining whether to perform a false-color suppression operation according to the determined types of interpolation operation of a plurality of pixel locations of said portion, to correct the pixel value of said pixel location.

17. The method of claim 16, wherein the type of interpolation operation is chosen from a set of interpolation operation types comprising inter-field interpolation and intra-field interpolation.

18. The method of claim 16, wherein the false-color suppression operation comprises a cross-color suppression operation.

19. The method of claim 16, wherein the false-color suppression operation comprises a cross-luminance suppression operation.

20. The method of claim 16, further comprising:
recording the determined type of interpolation operation for each said pixel location.

* * * * *